United States Patent [19]

Schwall

[11] Patent Number: 4,689,707
[45] Date of Patent: Aug. 25, 1987

[54] SUPERCONDUCTIVE MAGNET HAVING SHIM COILS AND QUENCH PROTECTION CIRCUITS

[75] Inventor: Robert E. Schwall, Sudbury, Mass.

[73] Assignee: International Business Machines Corporation, Armonk, N.Y.

[21] Appl. No.: 867,161

[22] Filed: May 27, 1986

[51] Int. Cl.⁴ .............................................. H01F 7/22
[52] U.S. Cl. .................................... 361/19; 361/141; 335/216
[58] Field of Search .................. 361/141, 19; 335/216, 335/219; 324/322; 307/306

[56] References Cited

U.S. PATENT DOCUMENTS

| | | | |
|---|---|---|---|
| 3,304,466 | 2/1967 | Minnich et al. | 361/19 |
| 3,466,504 | 9/1969 | Hart, Jr. | 361/19 |
| 3,474,294 | 10/1969 | Weaver et al. | 361/19 |
| 3,579,035 | 5/1971 | Thairy et al. | 361/19 |
| 3,711,744 | 1/1973 | Luton | 361/19 |
| 4,349,853 | 9/1982 | Sato | 361/19 |
| 4,559,576 | 12/1985 | Ries | 335/216 |

Primary Examiner—L. T. Hix
Assistant Examiner—David M. Gray
Attorney, Agent, or Firm—Douglas R. McKechnie

[57] ABSTRACT

A superconductive magnet has a main coil for creating a primary magnetic field and a plurality of shim coils for correcting aberrations in different gradients in the primary field. The shim coils are also connected in shunt with shim quench heaters and with superconductors which together with the shim coils form a plurality of persistent loops. A plurality of protective heaters are electrically connected to the main coil and are thermally connected to the superconductors. When quenching begins in the main coil, current is diverted through the protective heaters causing them to heat. This increases the temperature of the superconductors in the persistent loops causing them to switch from the superconductive to the resistive state and divert current into the shim quench heaters. These heaters in turn heat the shim coils and drive the shim coils resistive to safety dissipate any energy therein.

10 Claims, 7 Drawing Figures

SUPERCONDUCTIVE MAGNET HAVING SHIM COILS AND QUENCH PROTECTION CIRCUITS

This invention relates to improvements in superconductive magnets having circuits for protecting a primary or main coil and shim coils from damage due to quenching. It is particularly useful in large magnets of the type used in the field of magnetic resonance imaging.

BACKGROUND OF THE INVENTION

As is well known, a superconductive magnet has a main coil of superconductive material which is located in a cryostat and is cooled to a temperature near absolute zero by liquid helium. By superconduction, the main coil creates a high intensity, primary magnetic field into which, for example, the body being imaged is positioned. A plurality of superconductive shim coils are shaped and located relative to the main coil to correct for aberrations in different field gradients in the primary magnetic field.

The operation of a superconductive magnet occurs in three phases. First is a charging or energization phase during which a power supply external to the cryostat increases the current until it reaches the desired operating level. Second is an operating or normal phase during which current carried by a superconductive coil generates the desired magnetic field. In a "driven" magnet, the power supply remains connected to the main coil whereas in a "persistent" magnet, a persistent switch heater is de-energized allowing the power supply to be disconnected. A persistent current continues to flow through the coil and a superconductor connected across the coil. Third is a discharging or de-energization phase during which current is slowly decreased through an external circuit or power supply. Shim coils are also operated with the three phases and each shim coil is selectively energized during the first phase to develop the desired correction gradient.

Quenching is the phenomenon of a superconductor switching or transiting from a superconductive state, in which it has virtually no resistance, to a normal state in which it has some resistance. In large magnets such as required for magnetic resonance imaging, the magnetic field stores a tremendous amount of energy. If quenching occurs, such energy must be dissipated in a controlled manner to prevent damage to the magnet and preferably to prevent the coolant, liquid helium, from boiling off or vaporizing in a violent manner. While quenching can occur during any phase of operation, it more often occurs during the start-up or energization phase.

The problem of safe quenching is known in the prior art and different solutions have been provided particularly for protecting the main coil. One solution involves connecting an external resistor across the main coil of a driven magnet. When quenching begins, the power supply is disconnected forcing current through the resistor. The bulk of the magnetic field energy is thereby resistively dissipated outside of the magnet without causing physical damage or coolant boil-off. Another solution for a persistent magnet involves the recognition that the magnetic field energy can be safely dissipated in the mass of the magnet itself and by allowing coolant boil-off. In one such solution, the main coil is divided into a plurality of segments each having a resistive heater electrically connected in shunt therewith. Each heater is also physically shaped and placed adjacent to a different segment. When quenching occurs, it normally starts in a small section of the coil and spreads. The change in resistance of the section from zero to a higher value forces current through the shunt resistor which then heats another segment causing it to quench. This action spreads until all of the superconductive coils have switched to a resistive state. The energy is dissipated by resistive heating of all the coils and resistors which heating raises the temperature of the magnet without causing any localized fusing, melting, excess thermally induced stress or other damage. Some heat also is transferred into the liquid helium causing it to boil off. After quenching has occurred in such a controlled manner, the magnet can be started by refilling the cryostat with coolant and by re-energizing the magnet.

However, the solution to the problem of protecting shim coils is not so simple. Shim coils are designed to carry less current than the main coil and the conductors are accordingly smaller. Further, shim coils have fewer turns than the main coil and are mutually inductively coupled with the main coil so that small changes in current in the main coil induce much greater changes in the shim coil current. The result may be that quenching in the main coil, which reduces current therein, can so increase the current in the shim coils to quench them and other conductors causing them to melt or fuse. The large induced currents in the shim coils can also produce unacceptably large forces on the shim coils and associated structure. The invention overcomes this problem, in the manner discussed below.

SUMMARY OF THE INVENTION

One of the objects of the invention is to provide a superconductive persistent magnet having a main coil and shim coils, with means to allow a safe quench to occur, when the magnet is operating at its normal power level, in such a manner as to avoid any damage to the magnet.

Another object is to provide shim coil quench protection that quickly causes shim coils to quench, in the event the main coil quenches, and distribute the dissipation of the magnetic field energy safely.

A further object is to provide a persistent magnet having a main coil and shim coils, with means to allow an individual shim coil to quench safely without causing the main coil and the rest of the magnet to quench.

Briefly, the manner in which these and other objects of the invention are attained is to provide a main coil for creating a primary magnetic field and a plurality of shim coils for correcting aberrations in different gradients in the primary field. The shim coils are also connected in shunt with shim quench heaters and with superconductors which together with the shim coils form a plurality of persistent loops. A plurality of protective heaters are electrically connected to the main coil and are thermally connected to the superconductors. When quenching begins in the main coil, current is diverted through the protective heaters causing them to heat. This increases the temperature of the superconductors in the persistent loops causing them to switch from the superconductive to the resistive state and divert current into the shim quench heaters. These heaters in turn heat the shim coils and drive the shim coils resistive to safely dissipate any energy therein.

Other objects and advantages of the invention will be apparent from the following description taken in connection with the accompanying drawings wherein:

Figure 1:
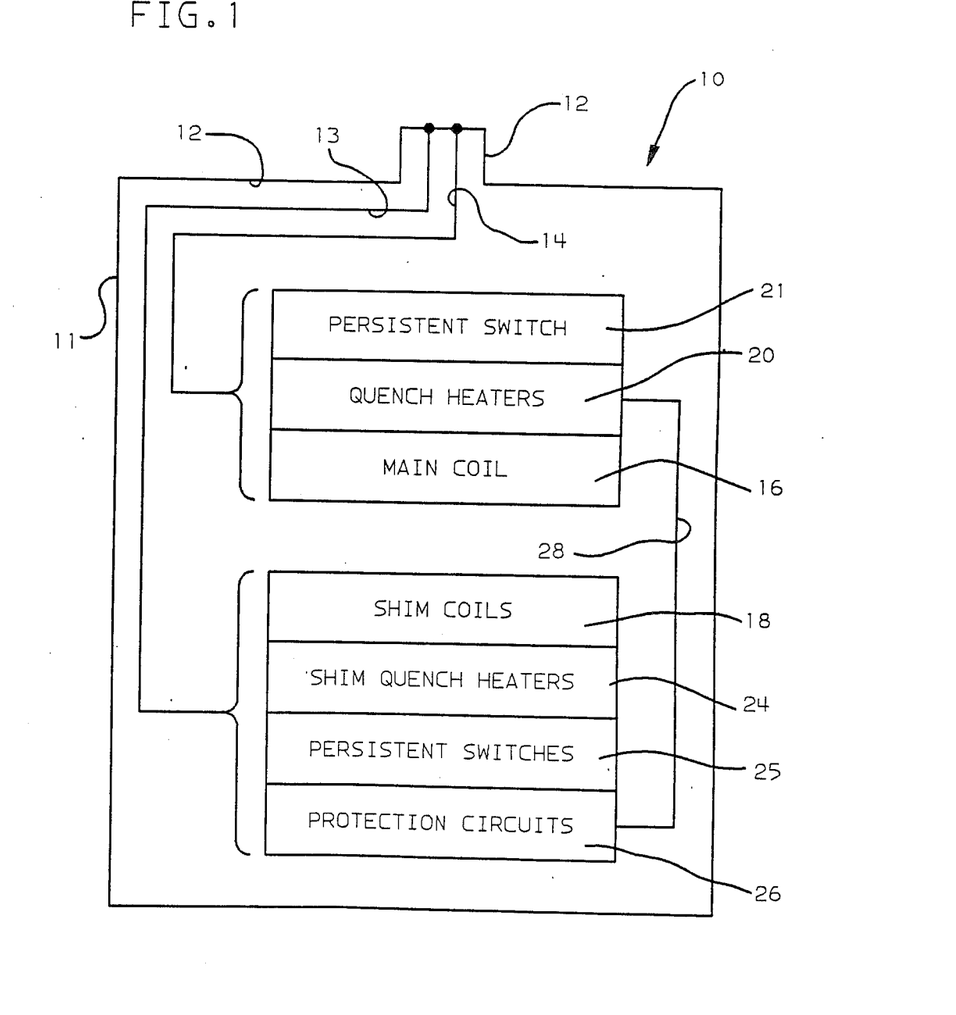
FIG. 1 is a schematic diagram of a persistent superconductive magnet embodying the invention.

Referring now to the drawings, and first to FIG. 1, a persistent superconductive magnet 10 includes a cryostat 11 containing liquid helium coolant for cooling the innards of the cryostat to a temperature near absolute zero. Cryostat 11 has a conventional stack 12 through which groups 13 and 14 of conductors provide electrical connections between the circuits internal to magnet 10 and external devices (not shown), such as power supplies and control circuits. Magnet 10 has a primary or main coil 16 for developing the primary magnetic field. A plurality of quench heaters 20 are mounted physically adjacent to coil 16 in thermal contact therewith so that, in a manner discussed more fully below, the quench heaters are operative, when quenching begins in the main coil, to heat themselves and transfer the heat into the main coil to switch it from the superconductive state to a resistive state. A persistent switch (PS) 21 is also connected to main coil 16 and is energized or actuated during the energization and de-energization phases of the operation of coil 16.

Enclosed in cryostat 11 also are a plurality of shim coils 18 shaped and located to correct aberrations in different gradients of the primary field created by superconduction of main coil 16. A plurality of shim coil quench heaters 24 are positioned in heat transfer relationship with shim coils 18 and are operative in response to current therein to heat the respective shim coils to a temperature above the threshold temperature of the superconductive state. Persistent switches 25 are connected to the shim coils and are actuated during the energization and de-energization phases to selectively energize and de-energize coils 18. A plurality of protection circuits 26, which form the novel part of the invention, are associated with shim coils 18 and are connected through group 28 of conductors to circuits connected with main coil 16, in the manner discussed in detail below and shown in other FIGS.

Figure 2:
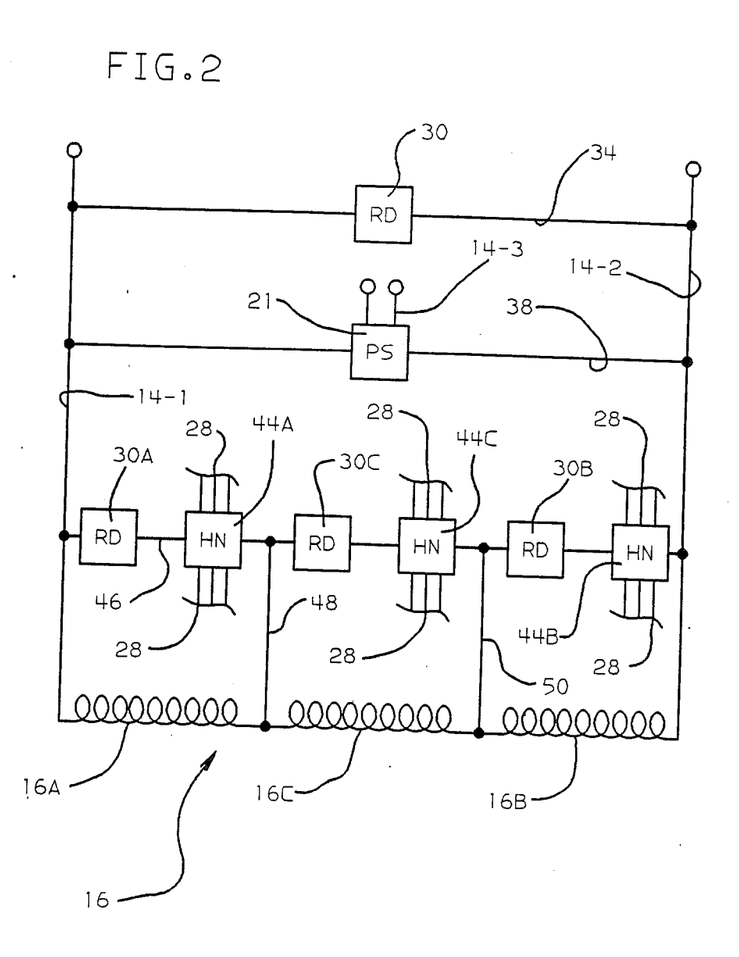
FIG. 2 is a schematic wiring diagram of the circuits associated primarily with the main coil of the magnet shown in FIG. 1.
Figure 4:
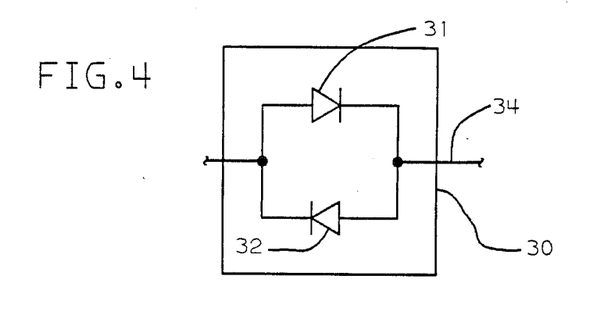
FIG. 4 is a schematic wiring diagram of the reversed diode circuit shown in FIG. 2.

Referring to FIG. 2, main coil 16 is composed of three segments or sections 16A-16C. Central segment 16B is connected to end segments 16A and 16C. The three segments are connected in series across superconductors or superconductive lines 14-1 and 14-2 of group 14 (FIG. 1). A reversed diode (RD) circuit 30 is connected by conductor 34 across lines 14-1 and 14-2. RD 30 limits voltage on the stack terminals to about eighteen volts. As shown in FIG. 4, RD 30 comprises a pair of diodes 31 and 32 connected in parallel with each other and reversed as to direction of conduction. At the temperature of 4.2 degrees Kelvin, which is the temperature of the liquid helium, diodes 31 and 32 operate much in the same manner as zener diodes operate at room temperature and provide blocking voltages of about eighteen volts, in both directions.

Figure 5:
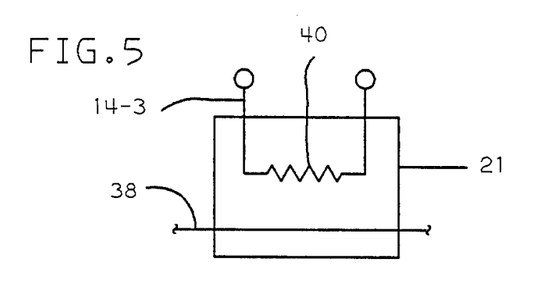
FIG. 5 is a schematic wiring diagram of a persistent switch shown in FIG. 1.

A superconductor 38 is also connected across lines 14-1 and 14-2 and forms with such lines and the main coil a loop through which persistent current flows. PS 21 is connected to line 38 and, as shown in FIG. 5, has a selectively actuated or energizable heater 40 disposed in thermal contact with the portion of line 38 passing through PS 21. Heater 40 is connectable by line 14-3 to an external power source (not shown) and is energized during the energization and de-energization phases of operation of the main coil.

Quench heaters 20 of FIG. 1, are located in three heater networks (HN) 44A-44C (FIG. 2), the networks being connected by line 46 in series with each other between lines 14-1 and 14-2. Further, the respective networks are also connected in shunt with the different coil segments 16A-16C by conductors 48 and 50. RD 30A is connected in series with network 44A across coil 16A, RD 30B is connected in series with network 44B across coil 16B and RD 30C is connected in series with HN 44C across coil 16C. RD's 30A-C prevent conduction along line 46 until a predetermined voltage of about eighteen volts has been reached. The presence of these diodes allows the magnet to be energized rapidly without circulating currents through the heater networks. Such circulating currents increase the time required for the magnetic field to stabilize after energization and, in the extreme, could lead to quenching by heating the coil segments.

Figure 6:
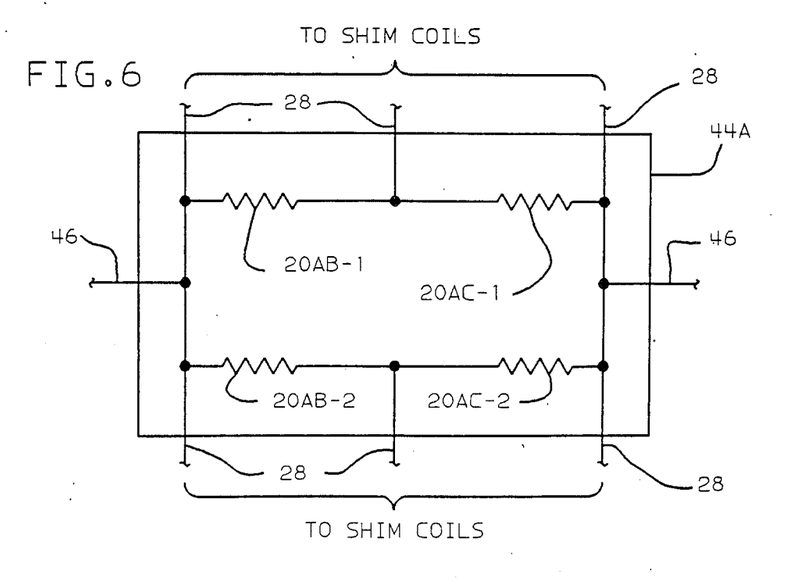
FIG. 6 is a schematic wiring diagram of a main coil segment quench heater network shown in FIG. 2.

While the respective quench heaters 20 are electrically connected in shunt with a specific coil segment, they are thermally connected with the other coil segments to perform a cross quench or quench back function. To illustrate this more specifically, FIG. 6 shows HN 44A as having four heaters 20 connected in a series parallel arrangement, each heater having a reference designation involving two letters. The first letter is associated with the letter on the main coil segment to which the heater is connected in shunt and the second letter is associated with the main coil segment where the heater is thermally connected. Thus, the designation 20AB-1 means that this quench heater is electrically connected in shunt with coil 16A and is thermally connected to coil 16B. There are two coils in each network connected to the same coil segment in order to uniformly and rapidly distribute the energy. Specifically, in HN44A, coils 20AB-1 and 20AB-2 are thermally connected to segment 16B and coils 20AC-1 and 20AC-2 are thermally connected to segment 16C. The main coil quench heaters also form a voltage divider network providing taps for lines 28 which are connected to the protection heaters as described more fully hereinafter. The other heaters in HN's 44B and 44C are similarly arranged. Lines 46, 48 and 50 are also superconductive.

The number of shim coils 18 is selected to provide correction for many but not necessarily all of the various primary field gradients. In the preferred embodiment, ten coils are provided to correct for the gradients set forth in Table 1. In this Table, the various gradient designations follow the commonly accepted rule where the Z direction is along the axis of the magnet and the X and Y directions are transverse thereto.

TABLE 1

| Coil No. | Gradient |
|---|---|
| 18-1 | X-Y |
| 18-2 | Y-Z |
| 18-3 | X-Z |
| 18-4 | $Z^2$ |
| 18-5 | $Z^4$ |
| 18-6 | $X^2-Y^2$ |
| 18-7 | Y |
| 18-8 | X |
| 18-9 | Z |
| 18-10 | $Z^3$ |

Figure 3:
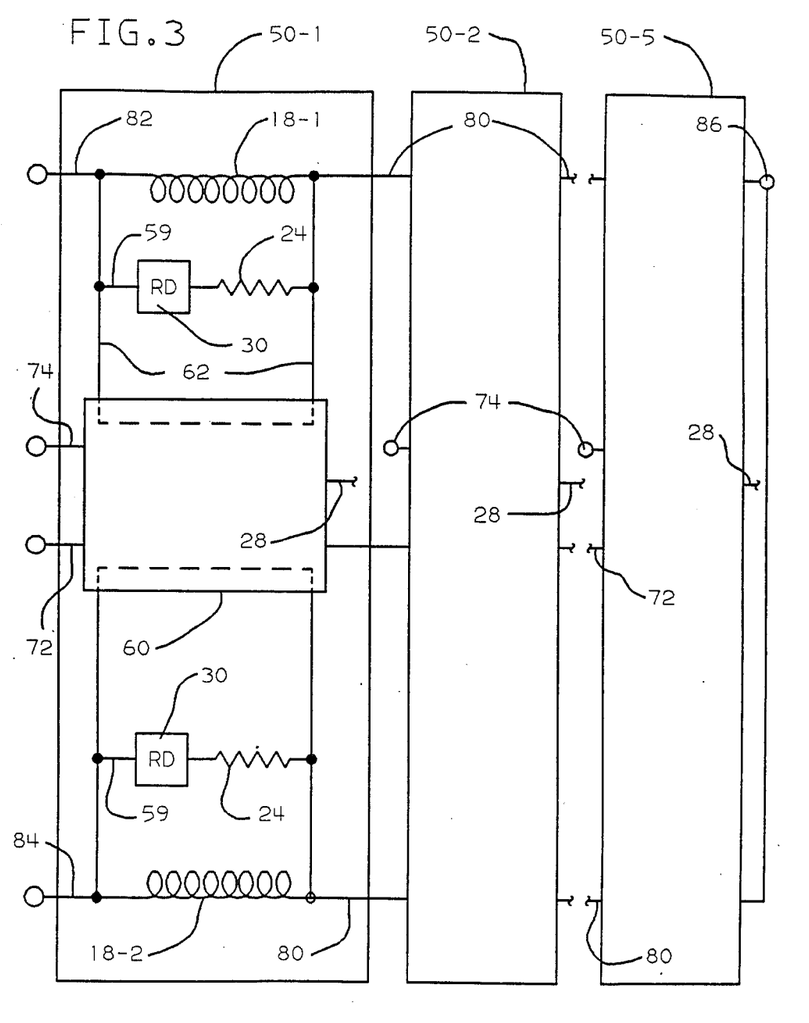
FIG. 3 is a schematic wiring diagram of the circuits associated primarily with the shim coils of the magnet shown in FIG. 1.

Referring to FIG. 3, the shim coil circuits are arranged in five sections 50-1 through 50-5, each of which is similar so that only one need be described in detail. Each section has a combined persistent switch/protection module 60 associated with two shim coils 18. The ends of each shim coil 18 are connected to the ends of a superconductor 62 to form a loop through for carrying the shim coil persistent current. The medial portion of each superconductor 62 passes through module 60. Connected across each coil 18 by a line 59 is an RD 30 and a shim coil quench heater 24. Heater 24 is placed in physical or thermal contact with the associated shim coil and is operative upon quenching being initiated in such coil to carry current and heat the entire coil to thereby dissipate the energy in both the heater and shim coil.

Figure 7:
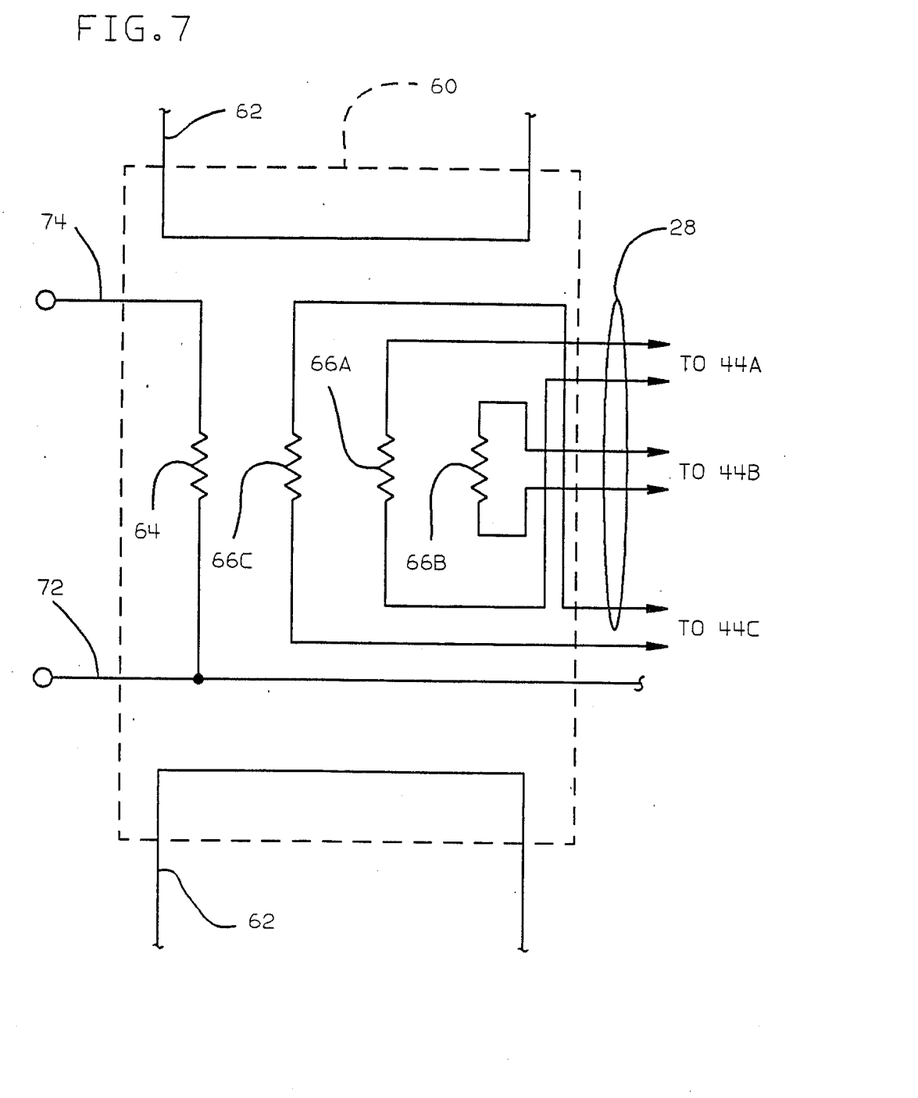
FIG. 7 is a schematic wiring diagram of a protective circuit, including a persistent switch, used in the invention.

As shown in FIG. 7, module 60 comprises four heaters 64 and 66A-C each of which is thermally connected to those portions of both lines 62 which portions pass through module 60. Energization of any one of these heaters is operative to heat such portions of both lines 62 above the threshold temperature causing such lines to switch from a superconductive state to a resistive state. One end of heater 64 is connected to a common line 72 that is further connected to all other heaters 64 in the other modules 60. The other end of heater 64 is connectable by line 74 to a selectively energizable external power source allowing heater 64 to act as a persistent switch heater. The remaining three heaters form protection heaters each one of which is connected to a different HN 44 by lines 28. In other words, each of heaters 66A-C is connected to a different HN 44 and thence to a different segment of main coil 16. When quenching occurs in one of the main coil segments, the corresponding one of heaters 66 carries current from such coil which in the manner described below causes the associated shim coil to be quenched.

Adjacent loops 62 are interconnected by superconductors 80 which allows the passage of shim coil energizing/de-energizing current during the first and third phases of operation of the shim coils. Further, shim coil energizing current passes through a common line 86 and two other lines 82 and 84 respectively connected with the upper shim coils and the lower shim coils as viewed in FIG. 3.

The operation of the system will now be described. The maximum amount of energy that will be in the system is that which is stored therein during the normal operating state of the magnet after the main coils and shim coils have been energized. In such phase of operation, a persistent current flows through the superconductors 14-1, 38, 14-2, and coils 16A - 16C. Similarly, persistent shim currents flow through the respective shim coils 18 and superconductors 62. During such operation, it will be recalled that all of the persistent switch heaters 40 and 64 are de-energized. For the purpose of illustrating the operation of the quenching, let us assume that a quench is initiated or begins in main coil segment 16A. At that time, the resistance of the coil segment increases thereby diverting current through network 44A. This causes the heaters 20A to increase in temperature. Heaters 20AC-1 and 2 heat up segment 16C causing it to quench and heaters 20AB-1 and 2 heat segment 16B to the non-superconductive state. When coils 16B and 16C quench, current is also diverted through networks 44B and 44C causing the respective heaters therein located on coil A to thereby heat the remainder of coil A driving it to the resistive state. Thus, all of coil segments 16A-16C become resistive and current and the heating effects thereof are uniformly distributed in a manner that prevents damage to any of the circuit elements.

When, in the above example, current flows through network 44A, some current from the main coil is diverted by the heaters therein to flow through all of heaters 66A of modules 60 to thereby drive all conductors 62 resistive in the portions passing through modules 60. This then causes current to flow through all of shim coil quench heaters 24 which thereupon heat the respective shim coils 18 and drive them into the resistive state. Because of the relative values of the initial resistance of heaters 66 and heater 20x, the conductors 60 are heated more quickly than the coils 16. The driving of shim coils 18 into the resistive state thus occurs prior to the driving of coils 16B and 16C into the resistive state. Further, the mutual inductive coupling between the main coil segments and the shim coils 18 is such that the small changes in the currents in the main coil which produce large changes in the currents in the shim coil, are precluded from causing damage because of the fact that all shim coils and quench heaters are now safely dissipating all of the energy associated therewith in a safe manner. As the quenching completes itself and the temperature of the magnet increases, liquid helium boils off in a safe and controlled manner and no damage is done to any of the conductors or circuit elements associated with the magnet. Thereafter, operation of the magnet can be resumed by refilling cryostat 11 with liquid helium and re-energizing the various circuits.

Another structural relationship will now be described with reference to the exemplary operation described above. Heaters 66A, 66B and 66C are constructed of copper, aluminum, or some other metal whose resistance increases as its temperature is increased from that of liquid helium. On the other hand, quench heaters 20 are constructed of a material, such as stainless steel, having a relatively constant resistance versus temperature characteristic at temperatures encountered in the cryostat. Additionally, heaters 20 are formed in heavy duty strips for carrying large currents associated with the main coil, and have a slow thermal response relative to heaters 66.

When a normal zone starts, such as in coil 16A, and current is diverted from 16A through the shunting elements, the magnetic field starts to change and the current in the axial shims (particularly coils 18-4 and 18-5) begins to increase rapidly. It is thus necessary to drive significant current through heater 66A and heat superconductor 62 very quickly. This is accomplished by making the resistance of 66A small compared to that of 20AB-1 (heater 66A being in parallel with 20AB-1 through lines 28) allowing a significant fraction of the initially shunted magnet current to flow through heater 66A.

However, as the resistance of coil 16A increases, more current is shunted through heaters 66A and 20Ax. If the resistances were to remain constant, 66A would quickly burn out. This is prevented by constructing 66A from copper or pure aluminum or some other metal with a strong temperature dependence of resistance. Thus, as current flows through 66A, and its temperature rises above about 20 Kelvin its resistance begins to increase. This causes the current shunted from 16A to flow through the heaters 20Ax rather than through heater 66A.

By way of example, heater 66A may be constructed of 36 AWG copper which has a resistance at 4.2 Kelvin about 1% of its room temperature value. The thermal link between the heater 66A and the conductor 62 is such that 62 becomes normal with a voltage of about 0.2 volts across 66A causing a current of about 1.6 amps to flow in 66A. A voltage of 50 volts applied continuously to 66A causes a current of only 2.7 amps to flow (because of the increase in resistance). The thermal connection between 66A and the helium bath is such that the 50 volt drive can be applied continuously without raising the temperature of 66A above room temperature. This dynamic range in voltage of 250 (50/0.2) is a figure of merit for the device. Using a constant resistance heater, such as manganin, for 66A the voltage dynamic range would be about 20.

Note that as a result of the above described design the shim coils actually become normal several seconds before coils 16B and 16C are driven normal by quench heaters 20. This is beneficial since once 16B and 16C become normal, the magnetic field begins to change more quickly thus increasing the drive on the shim coils.

For greater reliability, it might be desirable to provide redundant persistent switch heaters and protection heaters so that in the event one heater fails, the redundant one will continue to operate. Also, while each module 60 is associated with two shim coils, this is not essential and each shim coil could have its own module so that only one portion 62 need run through such module.

It should be apparent to those skilled in the art that other changes and modifications can be made without departing from the spirit and scope of the invention as defined in the appended claims.

What I claim as new and desire to secure by Letters Patent is:

1. A superconductive magnet comprising;
a first persistent current loop comprising a first superconductor and a main coil connected to said first superconductor, said main coil being operative in response to superconduction therein to generate a primary magnetic field;
a second persistent current loop comprising a second superconductor and a shim coil connected thereto, said shim coil being operative in response to superconduction therein to generate a corrective field for correcting aberrations in a predetermined gradient in said primary magnetic field, said shim coil having fewer turns than said main coil and being inductively coupled therewith whereby small changes in the current in said main coil cause much greater changes in the current in said shim coil;
characterized by the improvement comprising:
a first heater connected across said second persistent loop in parallel with said shim coil, said first heater being normally inoperative to carry current while said shim coil and said second superconductor are superconducting, said first heater being operative in response to current therein to heat said shim coil to a resistive state;
and protective circuit means comprising a second heater connected to said main coil for carrying current from said main coil upon quenching of said main coil, said second heater being disposed in thermal contact with said second superconductor to heat said second superconductor to a resistive state in response to said current from said main coil to thereby divert current in said second persistent loop through said second heater causing it to heat said shim coil to a resistive state and resistively dissipate energy therein.

2. A superconductive magnet in accordance with claim 1, comprising;
a third persistent current loop comprising a third superconductor and a second shim coil connected in a lopp for correcting aberrations in a field gradient different than said predetermined gradient, said third superconductor being disposed in thermal contact with said second heater and being switchable to a resistive state upon heating by said second heater;
and a third heater connected across said third persistence loop in parallel with said second shim coil, said third heater being normally inoperative to carry current while said second shim coil and said third superconductor are superconducting, said third heater being operative in response to switching of said third superconductor to a resistive state to receive current and heat said second shim coil to a resistive state to dissipate energy therein.

3. A superconductive magnet in accordance with claim 2, comprising;
a persistent switch heater disposed in thermal contact with said third conductor and being selectively energizable to switch said third superconductor between superconductive and resistive states.

4. A superconductive magnet in accordance with claim 1 wherein:
said second heater is constructed of a material the resistance of which increases as the temperature thereof increases.

5. A superconductive magnet in accordance with claim 4 wherein said material in said second heater is selected from the group of copper and aluminum.

6. A superconductive magnet comprising:
a superconductive main coil divided into a plurality of serially connected sections;
a first superconductor connected across said main coil and forming a closed circuit for carrying a persistent current to cause said main coil to generate a primary magnetic field;
a plurality of first quench heaters each one being electrically connected in parallel with one of said sections and thermally connected with a different section to provide quenchback upon quenching of the section electrically connected thereto;
a plurality of superconductive shim coils for correcting aberrations in different field gradients of said primary magnetic field;
a plurality of second superconductors each connected across a different one of said shim coils to form a plurality of superconducting loops for carrying persistent currents through said shim coils;
characterized by the improvement comprising:
a plurality of shim coil quench heaters each electrically connected across a different one of said shim coils, each shim coil quench heater being further disposed in thermal contact with the shim coil across which such heater is electrically connected;
and a plurality of protective heaters disposed in thermal contact with said second superconductors, each of said protective heaters being further electrically connected to one of said sections of said main coil, whereby quenching in any of said sections forces current through said protective heaters to thereby heat said second superconductors and divert shim current through said shim coil quench heaters to heat said shim coils to resistive states.

7. A superconductive magnet in accordance with claim 6 wherein said second conductors are arranged in pairs and each protective heater is disposed in thermal contact with different ones of said pairs.

8. A superconductive magnet in accordance with claim 7, comprising:
a plurality of selectively energizable persistent switch heaters each disposed in thermal contact with a different one of said pairs of second superconductors for selectively switching said pairs between superconductive and resistive states.

9. A superconductive magnet in accordance with claim 6, wherein:
said shim coil quench heaters being arranged in groups, each group having a plurality of shim coil quench heaters corresponding to the number of said sections of said main coil, all of said shim coil quench heaters in each group being disposed in thermal contact with at least one of said second superconductors.

10. A superconductive magnet in accordance with claim 6 wherein:
said protective heaters are constructed of a material whose resistance increases with temperature at a greater rate than occurs in said first quench heaters;
and said first quench heaters have a slower thermal response time then said protective heaters.

* * * * *